United States Patent
Zhang et al.

(10) Patent No.: US 9,918,215 B2
(45) Date of Patent: Mar. 13, 2018

(54) METHOD FOR SENDING DISCOVERY SIGNAL AND USER EQUIPMENT

(71) Applicant: Huawei Technologies Co., Ltd., Shenzhen, Guangdong (CN)

(72) Inventors: Qizhi Zhang, Shenzhen (CN); Qiang Li, Doha (QA)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/143,152

(22) Filed: Apr. 29, 2016

(65) Prior Publication Data

US 2016/0249201 A1    Aug. 25, 2016

Related U.S. Application Data

(63) Continuation of application No. PCT/CN2013/086312, filed on Oct. 31, 2013.

(51) Int. Cl.
*H04L 25/06* (2006.01)
*G01R 31/08* (2006.01)
(Continued)

(52) U.S. Cl.
CPC ......... *H04W 8/005* (2013.01); *H04B 1/7136* (2013.01); *H04W 48/16* (2013.01); *H04W 84/18* (2013.01); *H04B 2001/6908* (2013.01)

(58) Field of Classification Search
CPC ..... H04W 48/16; H04W 48/18; H04W 4/008; H04W 12/06; H04W 72/0453;
(Continued)

(56) References Cited

U.S. PATENT DOCUMENTS 7,701,996 B1 *  4/2010  Giallorenzi .......... H04B 1/7075
                                                  370/209
8,121,097 B2    2/2012  Li et al.
(Continued)

FOREIGN PATENT DOCUMENTS

CN    102857901 A    1/2013
CN    103118417 A    5/2013
(Continued)

OTHER PUBLICATIONS

"Discussion of D2D discovery methods", Alcatel-Lucent Shanghai Bell, Alcatel-Lucent, 3GPP TSG RAN WG1 Meeting #73, May 20-24, 2013, 5 pages, R1-132068.
(Continued)

*Primary Examiner* — Daniel Washburn
*Assistant Examiner* — Sarah Hassan

(57) ABSTRACT

The present invention provides a method for sending a discovery signal and user equipment. The method comprises determining a frequency-time position with a frequency-time hopping invariant according to the frequency-time hopping invariant, determining an initial frequency-time position of a discovery signal in an initial discovery frame according to the frequency-time position with the frequency-time hopping invariant and an idle frequency-time position in the initial discovery frame, and sending the discovery signal at the initial frequency-time position. The method comprises determining a second frequency-time position of the discovery signal in a next discovery frame following the current discovery frame, and sending the discovery signal at the second frequency-time position.

21 Claims, 4 Drawing Sheets

(51) Int. Cl.
*H04W 8/00* (2009.01)
*H04W 84/18* (2009.01)
*H04W 48/16* (2009.01)
*H04B 1/7136* (2011.01)
*H04B 1/69* (2011.01)

(58) Field of Classification Search
CPC ....... H04W 24/10; H04W 48/14; H04W 8/22;
H04W 24/08; H04W 48/04; H04W 84/18;
H04W 16/18; H04W 36/30
USPC .......................................................... 375/319
See application file for complete search history.

(56) References Cited

U.S. PATENT DOCUMENTS

| 2003/0033452 | A1* | 2/2003 | Himmel | H04W 74/06 710/9 |
| 2003/0109270 | A1* | 6/2003 | Shorty | H04L 12/2803 455/517 |
| 2006/0161222 | A1* | 7/2006 | Haubrich | A61B 5/0031 607/60 |
| 2010/0110929 | A1* | 5/2010 | Li | H04B 1/7143 370/254 |
| 2010/0190459 | A1 | 7/2010 | Li et al. | |
| 2010/0254312 | A1* | 10/2010 | Kennedy | H04W 40/00 370/328 |
| 2011/0268101 | A1* | 11/2011 | Wang | H04L 5/0053 370/344 |
| 2012/0082127 | A1 | 4/2012 | Wu et al. | |
| 2012/0307676 | A1* | 12/2012 | Chan | H04W 24/08 370/252 |

FOREIGN PATENT DOCUMENTS

| EP | 2 389 725 A2 | 11/2011 |
| JP | 2012507974 A | 3/2012 |
| WO | WO 2013/133857 A1 | 9/2013 |
| WO | WO 2014/205689 A1 | 12/2014 |

OTHER PUBLICATIONS

"Resource management for type 1 discovery", Qualcomm Incorporated, 3GPP TSG-RAN WG1 #74bis, Oct. 7-11, 2013, 7 pages, R1-134630.

Qizhi Zhang et al., "On the hopping pattern design for D2D discovery with invariant", 2014 IEEE Globecom Workshops, Dec. 8, 2014, p. 601-605.

ASUSTeK, "Method of resource allocation for D2D discovery," 3GPP TSG RAN WG1 Meeting #74bis, R1-134638, Guangzhou, China, Oct. 7-11, 2013, pp. 1-9.

* cited by examiner

| a | b | c | d | e |
|---|---|---|---|---|
| f | g | h | i | j |
| k | l | m | n | o |
| p | q | r | s | t |

Discovery frame 1

| g | h | i | j | f |
|---|---|---|---|---|
| r | s | t | p | q |
| d | e | a | b | c |
| o | k | l | m | n |

Discovery frame 2

| s | t | p | q | r |
|---|---|---|---|---|
| l | m | n | o | k |
| j | f | g | h | i |
| c | d | e | a | b |

Discovery frame 3

| m | n | o | k | l |
|---|---|---|---|---|
| e | a | b | c | d |
| q | r | s | t | p |
| i | j | f | g | h |

Discovery frame 4

| a | b | c | d | e |
|---|---|---|---|---|
| f | g | h | i | j |
| k | l | m | n | o |
| p | q | r | s | t |

Discovery frame 5

FIG. 2

| 0 | 1 | 2 |
|---|---|---|
| 3 | 4 | 5 |
| 6 | 7 | 8 |

Discovery frame 1

| 7 | 8 | 6 |
|---|---|---|
| 0 | 1 | 2 |
| 5 | 3 | 4 |

Discovery frame 2

| 3 | 4 | 5 |
|---|---|---|
| 7 | 8 | 6 |
| 2 | 0 | 1 |

Discovery frame 3

| 0 | 1 | 2 |
|---|---|---|
| 3 | 4 | 5 |
| 6 | 7 | 8 |

Discovery frame 4

FIG. 3

First user equipment group

| $a_1$ | $b_1$ | $c_1$ | $d_1$ | $e_1$ |
|---|---|---|---|---|
| $f_1$ | $g_1$ | $h_1$ | $i_1$ | $j_1$ |
| $k_1$ | $l_1$ | $m_1$ | $n_1$ | $o_1$ |
| $p_1$ | $q_1$ | $r_1$ | $s_1$ | $t_1$ |

Discovery frame 1

| $g_1$ | $h_1$ | $i_1$ | $j_1$ | $f_1$ |
|---|---|---|---|---|
| $r_1$ | $s_1$ | $t_1$ | $p_1$ | $q_1$ |
| $d_1$ | $e_1$ | $a_1$ | $b_1$ | $c_1$ |
| $o_1$ | $k_1$ | $l_1$ | $m_1$ | $n_1$ |

Discovery frame 2

| $s_1$ | $t_1$ | $p_1$ | $q_1$ | $r_1$ |
|---|---|---|---|---|
| $l_1$ | $m_1$ | $n_1$ | $o_1$ | $k_1$ |
| $j_1$ | $f_1$ | $g_1$ | $h_1$ | $i_1$ |
| $c_1$ | $d_1$ | $e_1$ | $a_1$ | $b_1$ |

Discovery frame 3

| $m_1$ | $n_1$ | $o_1$ | $k_1$ | $l_1$ |
|---|---|---|---|---|
| $e_1$ | $a_1$ | $b_1$ | $c_1$ | $d_1$ |
| $q_1$ | $r_1$ | $s_1$ | $t_1$ | $p_1$ |
| $i_1$ | $j_1$ | $f_1$ | $g_1$ | $h_1$ |

Discovery frame 4

| $a_1$ | $b_1$ | $c_1$ | $d_1$ | $e_1$ |
|---|---|---|---|---|
| $f_1$ | $g_1$ | $h_1$ | $i_1$ | $j_1$ |
| $k_1$ | $l_1$ | $m_1$ | $n_1$ | $o_1$ |
| $p_1$ | $q_1$ | $r_1$ | $s_1$ | $t_1$ |

Discovery frame 5

Second user equipment group

| $a_2$ | $b_2$ | $c_2$ | $d_2$ | $e_2$ |
|---|---|---|---|---|
| $f_2$ | $g_2$ | $h_2$ | $i_2$ | $j_2$ |
| $k_2$ | $l_2$ | $m_2$ | $n_2$ | $o_2$ |
| $p_2$ | $q_2$ | $r_2$ | $s_2$ | $t_2$ |

Discovery frame 1

| $o_2$ | $k_2$ | $l_2$ | $m_2$ | $n_2$ |
|---|---|---|---|---|
| $d_2$ | $e_2$ | $a_2$ | $b_2$ | $c_2$ |
| $r_2$ | $s_2$ | $t_2$ | $p_2$ | $q_2$ |
| $g_2$ | $h_2$ | $i_2$ | $j_2$ | $f_2$ |

Discovery frame 2

| $q_2$ | $r_2$ | $s_2$ | $t_2$ | $p_2$ |
|---|---|---|---|---|
| $m_2$ | $n_2$ | $o_2$ | $k_2$ | $l_2$ |
| $i_2$ | $j_2$ | $f_2$ | $g_2$ | $h_2$ |
| $e_2$ | $a_2$ | $b_2$ | $c_2$ | $d_2$ |

Discovery frame 3

| $h_2$ | $i_2$ | $j_2$ | $f_2$ | $g_2$ |
|---|---|---|---|---|
| $t_2$ | $p_2$ | $q_2$ | $r_2$ | $s_2$ |
| $b_2$ | $c_2$ | $d_2$ | $e_2$ | $a_2$ |
| $n_2$ | $o_2$ | $k_2$ | $l_2$ | $m_2$ |

Discovery frame 4

| $a_2$ | $b_2$ | $c_2$ | $d_2$ | $e_2$ |
|---|---|---|---|---|
| $f_2$ | $g_2$ | $h_2$ | $i_2$ | $j_2$ |
| $k_2$ | $l_2$ | $m_2$ | $n_2$ | $o_2$ |
| $p_2$ | $q_2$ | $r_2$ | $s_2$ | $t_2$ |

Discovery frame 5

FIG. 4

METHOD FOR SENDING DISCOVERY SIGNAL AND USER EQUIPMENT

CROSS-REFERENCE TO RELATED APPLICATION

This application is a continuation of International Application No. PCT/CN2013/086312, filed on Oct. 31, 2013, which is hereby incorporated by reference in its entirety.

TECHNICAL FIELD

Embodiments of the present invention relate to the field of communications technologies, and more specifically, to a method for sending a discovery signal and user equipment.

BACKGROUND

Device-to-device (Device to Device, D2D) communication refers to a manner in which user equipments communicate directly with each other instead of using a base station. A D2D technology can play a part in relieving a burden of a macro network and increasing a communication rate between user equipments. To implement D2D communication, user equipment needs to discover other user equipment that can perform D2D communication.

User equipment transmits a discovery (Discovery) signal by using a discovery (Discovery) frame, so that other user equipment can discover the user equipment, so as to perform D2D communication. Specifically, there is a periodic discovery frame, and the user equipment may send the discovery signal in the discovery frame. Each discovery frame may be divided into time units in terms of time, and each time unit may be divided into frequency units according to a same rule. In this way, the discovery frame used to send the discovery signal may include multiple frequency-time units (which may also be referred to as frequency-time positions), and each frequency-time position is indicated by using (i, j), where i indicates a frequency unit (which may also be referred to as a frequency domain position), and j indicates a time unit (which may also be referred to as a time domain position). The discovery frame may be embedded into a system, for example, may be embedded into a system frame of an LTE system. Such embedding may be continuous or discontinuous in terms of time, and may be continuous or discontinuous in terms of frequency. Bandwidth of the embedded discovery frame may occupy full system bandwidth, or may occupy partial system bandwidth. If two or more user equipments send a discovery signal always at a same time domain position in a same discovery frame, these user equipments cannot discover each other.

In addition, it is expected that some preset info/nation related to a discovery signal is sent at the same time when the discovery signal is sent. In the prior art, a method for sending the preset information is modulating the preset information into a discovery signal, but this consumes system resources. Another method is using a frequency domain position to indicate the preset information, but using a frequency domain position to indicate the preset information is limited by system bandwidth.

SUMMARY

Embodiments of the present invention disclose a method for sending a discovery signal and user equipment, so that preset information can be carried by using a frequency-time hopping invariant.

According to a first aspect, an embodiment of the present invention provides a method for sending a discovery signal, where the method is performed by a first user equipment, and the method includes: determining a frequency-time position with a frequency-time hopping invariant according to the frequency-time hopping invariant, where the frequency-time hopping invariant is used to indicate preset information; determining an initial frequency-time position of a discovery signal in an initial discovery frame according to the frequency-time position with the frequency-time hopping invariant and an idle frequency-time position in the initial discovery frame; sending the discovery signal at the initial frequency-time position; determining, according to a first frequency-time position of the discovery signal in a current discovery frame, a second frequency-time position of the discovery signal in a next discovery frame following the current discovery frame, where the current discovery frame is the initial discovery frame or any discovery frame that is after the initial discovery frame and that is used to send the discovery signal, the first frequency-time position and the second frequency-time position are the frequency-time positions with the frequency-time hopping invariant, the first frequency-time position includes a first frequency domain position and a first time domain position, the second frequency-time position includes a second frequency domain position and a second time domain position, and the first frequency domain position is different from the second frequency domain position; and sending the discovery signal at the second frequency-time position.

With reference to the first aspect, in a first possible implementation manner, the preset information includes any one or more of the following: user equipment group information, information related to an identifier of the first user equipment, and a service type.

With reference to the first possible implementation manner, in a second possible implementation manner, the determining, according to a first frequency-time position of the discovery signal in a current discovery frame, a second frequency-time position of the discovery signal in a next discovery frame following the current discovery frame comprises: determining the second frequency-time position by using a frequency-time hopping function, where inputs of the frequency-time hopping function are the first frequency domain position and the first time domain position, and outputs of the frequency-time hopping function are the second frequency domain position and the second time domain position.

With reference to the second possible implementation manner, in a third possible implementation manner, if the first frequency-time position is different from a frequency-time position of a discovery signal of second user equipment in the current discovery frame, the second frequency-time position is different from a frequency-time position of the discovery signal of the second user equipment in the next discovery frame following the current discovery frame, where the second user equipment and the first user equipment use the same frequency-time hopping function; or if the first time domain position is the same as a time domain position of a discovery signal of second user equipment in the current discovery frame and the first frequency domain position is different from a frequency domain position of the discovery signal of the second user equipment in the current discovery frame, the second time domain position is different from a time domain position of the discovery signal of the second user equipment in the next discovery frame following the current discovery frame.

With reference to the second possible implementation manner or the third possible implementation manner, in a fourth possible implementation manner, the frequency-time hopping function is different from a frequency-time hopping function used by third user equipment.

With reference to any possible implementation manner of the second possible implementation manner to the fourth possible implementation manner, in a fifth possible implementation manner, a time domain of a discovery frame used by the first user equipment to send the discovery signal does not overlap a time domain of discovery frame used by fourth user equipment to send the discovery signal.

With reference to any possible implementation manner of the second possible implementation manner to the fifth possible implementation manner, in a sixth possible implementation manner, the frequency-time hopping function is determined by using the following formula:

$$(i_{t+1}, j_{t+1}) = (u * i_t) \mod m, \{v * [(u * i_t) \mod m] + j_t - v * i_t\} \mod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

With reference to the sixth possible implementation manner, in a seventh possible implementation manner, the frequency-time position with the frequency-time hopping invariant is determined by using the following formula:

$$C = (j - v * i) \mod n,$$

where C indicates the frequency-time hopping invariant, and i and j are respectively a frequency domain position with the frequency-time hopping invariant and a time domain position with the frequency-time hopping invariant.

With reference to any possible implementation manner of the second possible implementation manner to the fifth possible implementation manner, in an eighth possible implementation manner, the frequency-time hopping function is determined by using the following formula:

$$(i_{t+1}, j_{t+1}) = ((i_t + u) \mod m, (j_t + v * i) \mod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

With reference to the eighth possible implementation manner, in a ninth possible implementation manner, the frequency-time position with the frequency-time hopping invariant is determined by using the following formula:

$$C = (i^2 - u * i - 2v^{-1} * u * j) \mod m,$$

where C indicates the frequency-time hopping invariant, and i and j are respectively a frequency domain position with the frequency-time hopping invariant and a time domain position with the frequency-time hopping invariant.

With reference to any possible implementation manner of the sixth possible implementation manner to the ninth possible implementation manner, in a tenth possible implementation manner, before the determining a frequency-time position that can be used to indicate the frequency-time hopping invariant, the method further includes: receiving any one or more of frequency-time hopping parameters sent by a base station, where the frequency-time hopping parameters include: m, n, u, and v.

According to a second aspect, an embodiment of the present invention provides user equipment, where the user equipment includes: a control unit, configured to determine a frequency-time position with a frequency-time hopping invariant according to the frequency-time hopping invariant, where the frequency-time hopping invariant is used to indicate preset information, where the control unit is further configured to determine an initial frequency-time position of a discovery signal in an initial discovery frame according to the frequency-time position with the frequency-time hopping invariant and an idle frequency-time position in the initial discovery frame; and a sending unit, configured to send the discovery signal at the initial frequency-time position, where the control unit is further configured to determine, according to a first frequency-time position of the discovery signal in a current discovery frame, a second frequency-time position of the discovery signal in a next discovery frame following the current discovery frame, where the first frequency-time position includes a first frequency domain position and a first time domain position, and the second frequency-time position includes a second frequency domain position and a second time domain position; and the sending unit is further configured to send the discovery signal at the second frequency-time position.

With reference to the second aspect, in a first possible implementation manner, the control unit is specifically configured to determine the second frequency-time position by using a frequency-time hopping function, where inputs of the frequency-time hopping function are the first frequency domain position and the first time domain position, and outputs of the frequency-time hopping function are the second frequency domain position and the second time domain position.

With reference to the first possible implementation manner, in a second possible implementation manner, the sending unit is specifically configured to: send the discovery signal by using the first frequency-time position different from a frequency-time position, in the current discovery frame, used by second user equipment to send a discovery signal, and send the discovery signal by using the second frequency-time position different from a frequency-time position, in the next discovery frame following the current discovery frame, used by the second user equipment to send the discovery signal, where the second user equipment and the user equipment use the same frequency-time hopping function; or the sending unit is specifically configured to: send the discovery signal by using the first frequency-time position that is the same as a time domain position, in the current discovery frame, used by the second user equipment to send the discovery signal and that is different from a frequency domain position, in the current discovery frame, used by the second user equipment to send the discovery signal, and send the discovery signal by using the second frequency-time position different from a time domain position, in the next discovery frame following the current discovery frame, used by the second user equipment to send the discovery signal.

With reference to the first possible implementation manner or the second possible implementation manner, in a third possible implementation manner, the control unit is specifically configured to determine a frequency-time hopping function different from a frequency-time hopping function used by third user equipment.

With reference to any possible implementation manner of the first possible implementation manner to the third possible implementation manner, in a fourth possible implementation manner, the sending unit is specifically configured to send the discovery signal by using a discovery frame that does not overlap a time domain of discovery frame used by fourth user equipment to send the discovery signal.

With reference to any possible implementation manner of the first possible implementation manner to the fourth possible implementation manner, in a fifth possible implementation manner, the control unit is specifically configured to determine the frequency-time hopping function by using the following formula:

$$(i_{t+1}, j_{t+1}) = (u*i_t) \bmod m, \{v*[(u*i_t) \bmod m] + j_t - v*i_t\} \bmod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

With reference to the fifth possible implementation manner, in a sixth possible implementation manner, the control unit is specifically configured to determine the frequency-time position with the frequency-time hopping invariant by using the following formula:

$$C = (j - v*i) \bmod n,$$

where C indicates the frequency-time hopping invariant, and i and j are respectively a frequency domain position with the frequency-time hopping invariant and a time domain position with the frequency-time hopping invariant.

With reference to any possible implementation manner of the first possible implementation manner to the fourth possible implementation manner, in a seventh possible implementation manner, the control unit is specifically configured to determine the frequency-time hopping function by using the following formula:

$$(i_{t+1}, j_{t+1}) = ((i_t + u) \bmod m, (j_t + v*i) \bmod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

With reference to the seventh possible implementation manner, in an eighth possible implementation manner, the control unit is specifically configured to determine the frequency-time position with the frequency-time hopping invariant by using the following formula:

$$C = (i^2 - u*i - 2v^{-1}*u*j) \bmod m,$$

where C indicates the frequency-time hopping invariant, and i and j are respectively a frequency domain position with the frequency-time hopping invariant and a time domain position with the frequency-time hopping invariant.

With reference to any possible implementation manner of the fifth possible implementation manner to the eighth possible implementation manner, in a ninth possible implementation manner, the user equipment further includes: a receiving unit, configured to receive any one or more of frequency-time hopping parameters sent by a base station, where the frequency-time hopping parameters include: m, n, u, and v.

According to a third aspect, an embodiment of the present invention provides user equipment, where the user equipment includes: a processor, configured to determine a frequency-time position with a frequency-time hopping invariant according to the frequency-time hopping invariant, where the frequency-time hopping invariant is used to indicate preset information, where the processor is further configured to determine an initial frequency-time position of a discovery signal in an initial discovery frame according to the frequency-time position with the frequency-time hopping invariant and an idle frequency-time position in the initial discovery frame; and a transmitter, configured to send the discovery signal at the initial frequency-time position, where the processor is further configured to determine, according to a first frequency-time position of the discovery signal in a current discovery frame, a second frequency-time position of the discovery signal in a next discovery frame following the current discovery frame, where the first frequency-time position includes a first frequency domain position and a first time domain position, and the second frequency-time position includes a second frequency domain position and a second time domain position; and the transmitter is further configured to send the discovery signal at the second frequency-time position.

With reference to the third aspect, in a first possible implementation manner, the processor is specifically configured to determine the second frequency-time position by using a frequency-time hopping function, where inputs of the frequency-time hopping function are the first frequency domain position and the first time domain position, and outputs of the frequency-time hopping function are the second frequency domain position and the second time domain position.

With reference to the first possible implementation manner, in a second possible implementation manner, the transmitter is specifically configured to: send the discovery signal by using the first frequency-time position different from a frequency-time position, in the current discovery frame, used by second user equipment to send a discovery signal, and send the discovery signal by using the second frequency-time position different from a frequency-time position, in the next discovery frame following the current discovery frame, used by the second user equipment to send the discovery signal, where the second user equipment and the user equipment use the same frequency-time hopping function; or the transmitter is specifically configured to: send the discovery signal by using the first frequency-time position that is the same as a time domain position, in the current discovery frame, used by the second user equipment to send the discovery signal and that is different from a frequency domain position, in the current discovery frame, used by the second user equipment to send the discovery signal, and send the discovery signal by using the second frequency-time position different from a time domain position, in the next discovery frame following the current discovery frame, used by the second user equipment to send the discovery signal.

With reference to the first possible implementation manner or the second possible implementation manner, in a third possible implementation manner, the processor is specifically configured to determine a frequency-time hopping function different from a frequency-time hopping function used by third user equipment.

With reference to any possible implementation manner of the first possible implementation manner to the third possible implementation manner, in a fourth possible implementation manner, the transmitter is specifically configured to send the discovery signal by using a discovery frame that does not overlap a time domain of discovery frame used by fourth user equipment to send the discovery signal.

With reference to any possible implementation manner of the first possible implementation manner to the fourth possible implementation manner, in a fifth possible implementation manner, the processor is specifically configured to determine the frequency-time hopping function by using the following formula:

$$(i_{t+1},j_{t+1})=(u*i_t)\bmod m, \{v*[(u*i_t)\bmod m]+j_t-v*i_t\}\bmod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

With reference to the fifth possible implementation manner, in a sixth possible implementation manner, the processor is specifically configured to determine the frequency-time position with the frequency-time hopping invariant by using the following formula:

$$C=(j-v*i)\bmod n,$$

where C indicates the frequency-time hopping invariant, and i and j are respectively a frequency domain position with the frequency-time hopping invariant and a time domain position with the frequency-time hopping invariant.

With reference to any possible implementation manner of the first possible implementation manner to the fourth possible implementation manner, in a seventh possible implementation manner, the processor is specifically configured to determine the frequency-time hopping function by using the following formula:

$$(i_{t+1},j_{t+1})=((i_t+u)\bmod m,(j_t+v*i)\bmod n),$$

where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

With reference to the seventh possible implementation manner, in an eighth possible implementation manner, the processor is specifically configured to determine the frequency-time position with the frequency-time hopping invariant by using the following formula:

$$C=(i^2-u*i-2v^{-1}*u*j)\bmod m,$$

where C indicates the frequency-time hopping invariant, and i and j are respectively a frequency domain position with the frequency-time hopping invariant and a time domain position with the frequency-time hopping invariant.

With reference to any possible implementation manner of the fifth possible implementation manner to the eighth possible implementation manner, in a ninth possible implementation manner, the user equipment further includes:

a receiver, configured to receive any one or more of frequency-time hopping parameters sent by a base station, where the frequency-time hopping parameters include: m, n, u, and v.

According to the embodiments of the present invention, user equipment can determine, according to a first frequency-time position of a discovery signal in a current discovery frame, a second frequency-time position of the discovery signal in a next discovery frame following the current discovery frame. In this case, the second frequency-time position of the discovery signal in the next discovery frame is related to the first frequency-time position of the discovery signal in the current discovery frame and is not related to an initial frequency-time position of the discovery signal or a frame number of a discovery frame. Further, there is a frequency-time hopping invariant, the frequency-time hopping invariant does not vary with hopping of a frequency-time position of the discovery signal, and therefore the frequency-time hopping invariant can carry preset information. The user equipment can determine, according to the frequency-time hopping invariant, the initial frequency-time position at which the discovery signal is sent. A frequency-time hopping invariant corresponding to the user equipment does not vary with the hopping of the frequency-time position of the discovery signal. Once knowing the frequency-time position of the discovery signal, a receive end of the discovery signal can determine preset information of the discovery signal corresponding to the frequency-time position.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a schematic diagram of a pattern of a signal transmission method according to an embodiment of the present invention;

FIG. 3 is a schematic diagram of a pattern of a signal transmission method according to an embodiment of the present invention;

FIG. 4 is a schematic diagram of a pattern of a signal transmission method according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention can be applied in various communications system, for example, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, and the Universal Mobile Telecommunications System (Universal Mobile Telecommunication System, "UMTS" for short).

User equipment (User Equipment, UE), also referred to as a mobile terminal (Mobile Terminal, MT), mobile user equipment, and the like, may communicate with one or more core networks through a radio access network (for example, Radio Access Network, RAN). The user equipment may be a mobile terminal, such as a mobile phone (also referred to as a "cellular" phone) and a computer having a mobile function. For example, the user equipment may be a portable, pocket-sized, handheld, computer built-in, or in-vehicle mobile apparatus.

A base station may be an e NodeB in LTE, which is not limited in the present invention.

Figure 1:
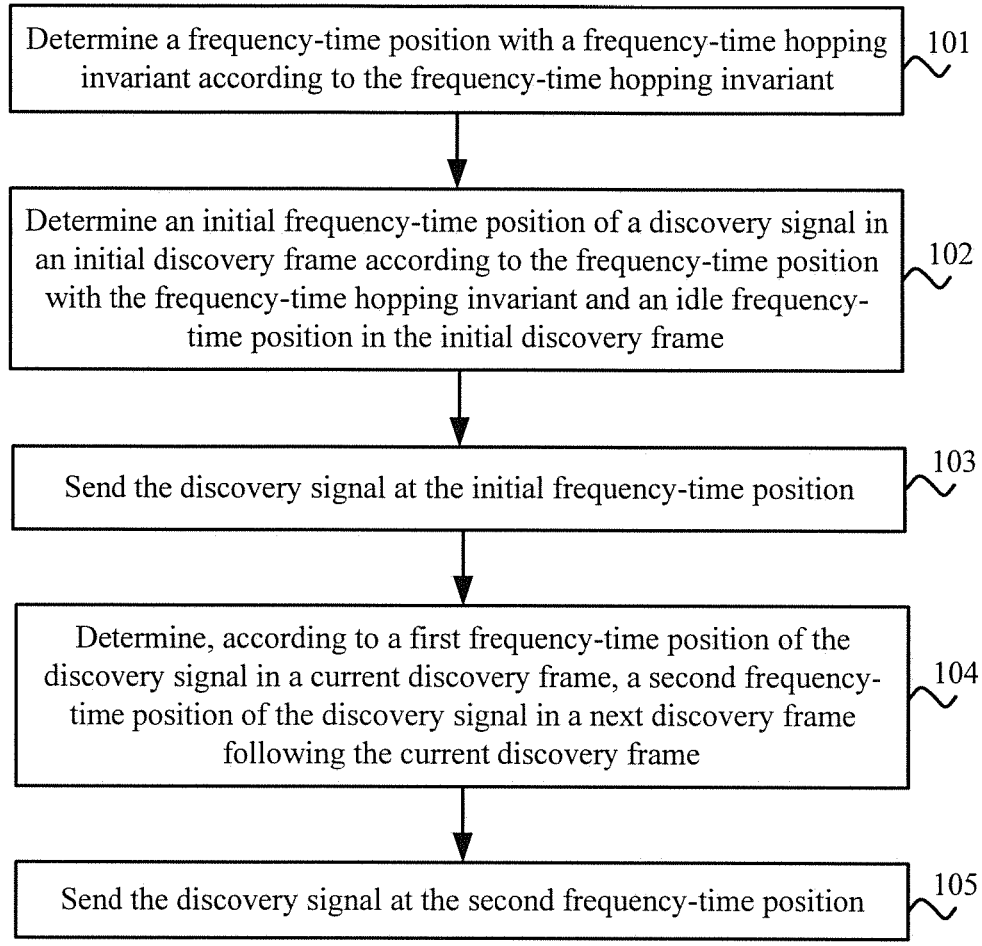
FIG. 1 is a schematic flowchart of a method for sending a discovery signal according to an embodiment of the present invention.

FIG. 1 is a schematic flowchart of a method for sending a discovery signal according to an embodiment of the present invention. The method shown in FIG. 1 is performed by first user equipment.

101. Determine a frequency-time position with a frequency-time hopping invariant according to the frequency-time hopping invariant, where the frequency-time hopping invariant is used to indicate preset information.

102. Determine an initial frequency-time position of a discovery signal in an initial discovery frame according to the frequency-time position with the frequency-time hopping invariant and an idle frequency-time position in the initial discovery frame.

103. Send the discovery signal at the initial frequency-time position.

After sending the discovery signal at the initial frequency-time position of the initial discovery frame, the first user equipment may continue sending the discovery signal in a discovery frame after the initial discovery frame. In this case, the first user equipment may perform step 104 and step 105.

104. Determine, according to a first frequency-time position of the discovery signal in a current discovery frame, a second frequency-time position of the discovery signal in a next discovery frame following the current discovery frame, where the current discovery frame is the initial discovery frame or any discovery frame that is after the initial discovery frame and that is used to send the discovery signal, the first frequency-time position and the second frequency-time position are the frequency-time positions with the frequency-time hopping invariant, the first frequency-time position includes a first frequency domain position and a first time domain position, the second frequency-time position includes a second frequency domain position and a second time domain position, and the first frequency domain position is different from the second frequency domain position.

105. Send the discovery signal at the second frequency-time position.

According to the method shown in FIG. 1, first user equipment can determine, according to a first frequency-time position of a discovery signal in a current discovery frame, a second frequency-time position of the discovery signal in a next discovery frame following the current discovery frame. In this case, the second frequency-time position of the discovery signal in the next discovery frame is related to the first frequency-time position of the discovery signal in the current discovery frame and is not related to an initial frequency-time position of the discovery signal or a frame number of a discovery frame. Further, there is a frequency-time hopping invariant, and the frequency-time hopping invariant can carry preset information. The first user equipment can determine, according to the frequency-time hopping invariant, the initial frequency-time position at which the discovery signal is sent. A frequency-time hopping invariant corresponding to the first user equipment does not vary with hopping of a frequency-time position of the discovery signal. Once knowing the frequency-time position of the discovery signal, a receive end of the discovery signal can determine preset information of the discovery signal corresponding to the frequency-time position. Therefore, a manner of using the frequency-time hopping invariant to carry the preset information is not limited by system bandwidth. In addition, it is not required to modulate the preset information into the discovery signal, and therefore system resources can be reduced.

Further, the preset information may include one or more of the following: user equipment group information, information related to an identifier (Identifier, ID) of the first user equipment, a service type, and the like, where the service type may be information about dining, entertainment, a shopping mall, calling for help, search and rescue, and the like.

Specifically, the determining an initial frequency-time position of a discovery signal in an initial discovery frame according to the frequency-time position with the frequency-time hopping invariant and an idle frequency-time position in the initial discovery frame includes: the first user equipment may determine multiple frequency-time positions with the frequency-time hopping invariant. In the initial discovery frame, all these frequency-time positions with the frequency-time hopping invariant may be idle frequency-time positions, that is, no other user equipment uses these frequency-time positions to send a discovery signal. Alternatively, some of the frequency-time positions with the frequency-time hopping invariant are idle frequency-time positions. In this case, the first user equipment may randomly select one frequency-time position from the idle frequency-time positions with the frequency-time hopping invariant and use the frequency-time position as the initial frequency-time position. In addition, the initial discovery frame may have only one idle frequency-time position with the frequency-time hopping invariant. In this case, the first user equipment uses the idle frequency-time position as the initial frequency-time position.

Specifically, the determining, according to a first frequency-time position of the discovery signal in a current discovery frame, a second frequency-time position of the discovery signal in a next discovery frame following the current discovery frame includes: the first user equipment may determine the second frequency-time position by using a frequency-time hopping function, where the inputs of the frequency-time hopping function are the first frequency domain position and the first time domain position, and outputs of the frequency-time hopping function are the second frequency domain position and the second time domain position.

Optionally, in an embodiment, the first user equipment may determine the frequency-time hopping function by using the following formula:

$$(i_{t+1}, j_{t+1}) = (u^* i_t) \bmod m, \{v^*[(u^* i_t) \bmod m] + j_t - v^* i_t\} \bmod n) \quad \text{Formula 1.1}$$

where $i_t$ is the first frequency domain position, $i_{t+1}$ is the second frequency domain position, $j_t$ is the first time domain position, and $j_{t+1}$ is the second time domain position, $i \in I$, $I=\{1, 2, \ldots, m-1\}$, $j \in J$, $J=\{0, 1, 2, \ldots, n-1\}$; m, n, u, and v are all positive integers, u is relatively prime to m, (u−1) is relatively prime to m, v is relatively prime to m, and mod indicates a modulo operation; m, n, u, and v are referred to as frequency-time hopping parameters.

Optionally, in another embodiment, the first user equipment may also determine the frequency-time hopping function by using the following formula:

$$(i_{t+1}, j_{t+1}) = ((i_t + u) \bmod m, (j_t + v^* i) \bmod n) \quad \text{Formula 1.2}$$

where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, m exactly divides n, and mod indicates a modulo operation; m, n, u, and v are referred to as frequency-time hopping parameters; I={0, 1, 2, . . . , m−1} and J={0, 1, 2, . . . , n−1}.

Further, if the first user equipment determines the frequency-time hopping function by using the formula 1.1, the frequency-time position with the frequency-time hopping invariant may be determined by using the following formula:

$$C=(j-v*i) \bmod n \qquad \text{Formula 1.3}$$

where C indicates the frequency-time hopping invariant, and i and j are respectively a frequency domain position with the frequency-time hopping invariant and a time domain position with the frequency-time hopping invariant.

Further, if the first user equipment determines the frequency-time hopping function by using the formula 1.2, the frequency-time position with the frequency-time hopping invariant may be determined by using the following formula:

$$C=(i^2-u*i-2v^{-1}*u*j) \bmod m \qquad \text{Formula 1.4}$$

where C indicates the frequency-time hopping invariant, and i and j are respectively a frequency domain position with the frequency-time hopping invariant and a time domain position with the frequency-time hopping invariant.

Further, if the first frequency-time position is different from a frequency-time position of a discovery signal of second user equipment in the current discovery frame, the second frequency-time position is different from a frequency-time position of the discovery signal of the second user equipment in the next discovery frame following the current discovery frame, where the second user equipment and the first user equipment use the same frequency-time hopping function, that is, the first user equipment and the second user equipment determine the frequency-time hopping function by using a same formula and same frequency-time hopping parameters. If the first time domain position is the same as a time domain position of a discovery signal of second user equipment in the current discovery frame and the first frequency domain position is different from a frequency domain position of the discovery signal of the second user equipment in the current discovery frame, the second time domain position is different from a time domain position of the discovery signal of the second user equipment in the next discovery frame following the current discovery frame. If two user equipments use the same frequency-time hopping function, if initial frequency-time positions used by the two user equipments are different, when hopping, discovery signals of the two user equipments do not hop to a same frequency-time position. In this way, it can be ensured that the two user equipments never use the same frequency-time position. In addition, if time domain positions used by the two user equipments are the same, time domain positions used by the two user equipments in a next discovery frame are different. Therefore, even if the two user equipments use a same time domain position in a discovery frame and consequently cannot discover each other, the discovery signals of two user equipments can hop to different time domain positions in a next discovery frame, so that the two user equipments can discover each other. The first user equipment and the second user equipment may belong to a same user equipment group. In this case, the user equipment group may further include more user equipments, and all these user equipments use the same frequency-time hopping function. In other words, if there are multiple user equipments, and any two user equipments of these user equipments can be respectively regarded as the foregoing first user equipment and second user equipment, it may be considered that these user equipments belong to a same user equipment group. Apparently, a quantity of user equipments in one user equipment group cannot exceed a quantity of frequency-time resources in a discovery frame. For example, if the frequency-time hopping function is determined according to the formula 1.1, a user equipment group corresponding to the frequency-time hopping function has a maximum of (m−1)*n user equipments; if the frequency-time hopping function is determined according to the formula 1.2, the user equipment group corresponding to the frequency-time hopping function has a maximum of m*n user equipments.

Further, the frequency-time hopping function used by the first user equipment is different from a frequency-time hopping function used by third user equipment. In this way, even if one or more time domain positions used by the first user equipment and the third user equipment overlap, there is always at least one non-overlapped time domain position. Therefore, the first user equipment and the third user equipment can always discover each other. In this case, the first user equipment and the third user equipment belong to two different user equipment groups.

Optionally, in an embodiment, the first user equipment and the third user equipment may use frequency-time hopping functions that are determined by using different formulas. For example, the first user equipment may use a frequency-time hopping function determined by using the formula 1.1, and the third user equipment may use a frequency-time hopping function determined by using the formula 1.2.

Optionally, in another embodiment, the first user equipment and the third user equipment use a frequency-time hopping function determined by using a same formula. If both the first user equipment and the third user equipment use the frequency-time hopping function determined by using the formula 1.1, the first user equipment and the third user equipment may use same m and n and use different u and v. It is assumed that the first user equipment uses $u_1$ and $v_1$, and the third user equipment uses $u_2$ and $v_2$. If $u_1$, $v_1$, $u_2$, and $v_2$ meet the following conditions: $(u_1-u_2, m)=1$ and $v_1*(u_1-1) \bmod m \equiv v_2*(u_2-1) \bmod m$, where $(u_1-u_2, m)=1$ indicates that $u_1-u_2$ is relatively prime to m, the first user equipment and the third user equipment do not simultaneously send a discovery signal in three consecutive discovery frames if the first user equipment and the third user equipment perform frequency-time hopping by using the frequency-time hopping function determined by using the formula 1.1. If $u_1$, $v_1$, $u_2$, and $v_2$ meet the following conditions: m=p and is a prime, $u_1 \neq u_2$ mod p, but there is a t that enables $u_1^t = u_2$ mod p, the first user equipment and the third user equipment simultaneously send a discovery signal in a maximum of t discovery frames of one discovery pattern change period (that is, p−1 discovery frames) if the first user equipment and the third user equipment perform frequency-time hopping by using the frequency-time hopping function determined by using the formula 1.1. If both the first user equipment and the third user equipment use the frequency-time hopping function determined by using the formula 1.2, the first user equipment and the third user equipment may use same m and n and use different u and v. It is assumed that the first user equipment uses $u_1$ and $v_1$, and the third user equipment uses $u_2$ and $v_2$, and if $u_1$, $v_1$, $u_2$, and $v_2$ meet the following condition: $u_1*v_1$ mod $m_1 \neq u_2*v_2$ mod m, if both the first user equipment and the third user equipment use the frequency-time hopping function determined by using the formula 1.2, it can be ensured that the first user equipment and the third user equipment rarely use a same time domain position within one discovery pattern change period to send a discovery signal. Particularly, if m is a prime, it can be ensured that the two user equipments simultaneously send their respective discovery signals at most twice within one discovery pattern change period. Optionally, for x user equipments, if they all use a frequency-time hopping function determined by using the formula 1.3, and x is relatively prime to m, different u and v are configured for any two user equipments in the x user equipments to make calculated (u*v)mod m of the two user equipments different, and then it can be ensured that any two user equipments in the x user equipments rarely send a discovery signal simultaneously within one discovery pattern change period. Particularly, if m is a prime, it can be ensured that the two user equipments simultaneously send their respective discovery signals at most twice within one discovery pattern change period. Apparently, different u and v are configured for any two user equipments in the x user equipments, and therefore it may be considered that the x user equipments respectively belong to x user equipment groups.

Further, a time domain of a discovery frame used by the first user equipment to send the discovery signal does not overlap a discovery frame used by fourth user equipment to send a discovery signal. Even if the first user equipment and the fourth user equipment use the same frequency-time hopping function, because time domains used by the fourth user equipment and the first user equipment to send the discovery signal do not overlap, there is at least one discovery frame used only by the fourth user equipment, that is, in the discovery frame, the discovery signal is sent only by the fourth user equipment. Similarly, there is also at least one discovery frame used only by the first user equipment. In this case, the first user equipment and the fourth user equipment respectively belong to two user equipment groups.

In conclusion, when the first user equipment determines, by using the frequency-time hopping functions determined by using the formula 1.1 and the formula 1.2, the second frequency-time position so as to send the discovery signal, the following conditions can be met:

Condition 1: The frequency-time position of the discovery signal of the first user equipment in the next discovery frame is related only to the frequency-time position of the discovery signal in the current discovery frame and is not related to an initial frequency-time position of the discovery signal or a frame number of a discovery frame.

Condition 2: A frequency domain position of the discovery signal of the first user equipment in the next discovery frame is different from a frequency domain position of the discovery signal in the current discovery frame.

Condition 3: There is a frequency-time hopping invariant, and the frequency-time hopping invariant can be determined according to a frequency-time position of the discovery signal of the first user equipment in any discovery frame. In other words, for same user equipment, no matter how the frequency-time position of the discovery signal of the first user equipment in the discovery frame hops, a constant value can be determined according to the frequency-time position, and this value is referred to as a frequency-time hopping invariant. The frequency-time hopping invariant may be used to indicate the preset information of the discovery signal, where the preset information may include any one or more of the following information: user equipment group information, information related to an identifier (ID) of the first user equipment, information related to a service type, and the like.

Condition 4: If two discovery signals of two user equipments belonging to a same user equipment group are at different frequency-time positions in a current discovery frame, the two discovery signals of the two user equipments are at different frequency-time positions in a next discovery frame.

Condition 5: If two discovery signals of two user equipments belonging to a same user equipment group are at a same time domain position but at different frequency domain positions in a current discovery frame, the two discovery signals of the two user equipments are at different time domain positions in a next discovery frame.

It should be noted that "the next discovery frame" mentioned in this specification is "a next discovery frame following the current discovery frame".

The following provides a proving process, so as to prove that the frequency-time hopping function determined according to the formula 1.1 can meet the foregoing condition 1 to condition 5.

In a first aspect, apparently, the frequency-time position of the discovery signal of the first user equipment in the next discovery frame is related only to the frequency-time position of the discovery signal in the current discovery frame and is not related to the initial frequency-time position of the discovery signal or a frame number of a discovery frame. In addition, the first frequency-time position of the discovery signal of the first user equipment is different from the second frequency-time position of the discovery signal.

In a second aspect, it may be learned from u≠1(mod m) that, the formula 1.1 meets the following condition in the frequency-time hopping function: the first frequency domain position is different from the second frequency domain position.

In a third aspect, apparently, the formula 1.2 meets that for same user equipment, no matter how a frequency-time position of a discovery signal of the user equipment in a discovery frame hops, a constant value can be determined according to the frequency-time position.

In a fourth aspect, it is assumed that a second frequency-time position of a discovery signal of user equipment in the user equipment group is (i, j), and a second frequency-time position of a discovery signal of another user equipment in the user equipment group is (x, y), but frequency-time positions of the two discovery signals in a next discovery frame are the same.

$$ui \equiv ux(\bmod m) \qquad (1)$$

$$v(ui \bmod m)+j-vi \equiv v(ux \bmod m)+y-vx(\bmod n) \qquad (2)$$

According to (1) and "u is relatively prime to m", i≡x (mod m) is obtained; further, i and x belong to I, and therefore i=x. According to (1) and (2), j−vi≡y−vx(mod n) is obtained; further, i=x, and therefore j≡y; further, j and y belong to J, and therefore j=y, which contradicts (i, j)≠(x, y). Therefore, the formula 1.1 meets the following condition in the frequency-time hopping function: if the first frequency-time position is different from a first frequency-time position used by another user equipment, the second frequency-time position is different from a second frequency-time position used by the another user equipment, where the another user equipment belongs to the user equipment group.

In a fifth aspect, it is assumed that a second frequency-time position of a discovery signal of user equipment in the user equipment group is (i, j), and a second frequency-time position of a discovery signal of another user equipment in the user equipment group is (x, j), where i is not equal to x, but time domain positions of the two discovery signals in a next discovery frame are the same.

$$v(ui \bmod m)+j-vi \equiv v(ux \bmod m)+j-vx (\bmod n) \quad (3)$$

According to (3) and "m exactly divides n", $v(u-1)i+j \equiv v(u-1)x+j (\bmod m)$ is obtained; according to "(u-1) is relatively prime to m, and v is relatively prime to m", it is obtained that i≡m is false. Therefore, the formula 1.1 meets the following condition in the frequency-time hopping function: if the first time domain position is the same as a first time domain position used by the another user equipment, the second time domain position is different from a second time domain position used by the another user equipment.

Apparently, the formula 1.2 can also meet the foregoing condition 1 to condition 5.

It may be understood that, a person skilled in the art may further design a formula similar to the formula 1.1 and the formula 1.2. User equipment may send a discovery signal by using a frequency-time hopping function determined according to the similar formula, and the frequency-time hopping function determined according to the similar formula can meet the foregoing condition 1 to condition 5.

FIG. 2 is a schematic diagram of a pattern of a signal transmission method according to an embodiment of the present invention. FIG. 2 is a specific embodiment of FIG. 1, where a frequency-time hopping function is determined by using the formula 1.1, and five patterns of five consecutive discovery frames used by different user equipments in a first user equipment group to send a discovery signal are shown. It should be noted that FIG. 2 is a specific embodiment that is provided merely to help a person skilled in the art to understand the embodiments of the present invention, instead of limiting the protection scope of the present invention. In addition, "consecutive" in "the consecutive discovery frames" herein refers to continuity relative to discovery frames. Any two consecutive discovery frames may be separated by a time T that is used to transmit other information except a discovery signal, where T is a positive integer.

If the frequency-time hopping function is determined by using the formula 1.1, m=n=5, u=3, and v=1 are set. There are 20 user equipments in the first user equipment group, which are respectively indicated by using letters a to t. In other words, in the pattern shown in FIG. 2, all the 20 user equipments in the first user equipment group abide by the following frequency-time hopping function:

$$(i_{t+1},j_{t+1})=(3*i_t) \bmod 5, \{1*[(3*i_t) \bmod 5]+j_t-1*i_t\} \bmod 5) \quad \text{Formula 1.5}$$

User equipment a is used as an example, and if it is expected that a value of preset information carried by the user equipment a is 4 (that is, a frequency-time hopping invariant is 4), a frequency-time position whose frequency-time hopping invariant is 4 can be determined by using the following formula according to the formula 1.3:

$$4=(j-1*i) \bmod 5 \quad \text{Formula 1.6}$$

Therefore, frequency-time positions whose frequency-time hopping invariant is 4 are (1, 0), (3, 2), (4, 3), and (2, 1). It is assumed that an initial discovery frame is a discovery frame 1, and if all frequency-time positions except the frequency-time position (1, 0) are occupied by other user equipments, the user equipment a sends a discovery signal by using the frequency-time position (1, 0); or if there is an idle frequency-time position to select, the user equipment a selects the frequency-time position (1, 0) to send the discovery signal. Afterward, the user equipment a performs frequency-time hopping by using the formula 1.5 as the frequency-time hopping function, and sends the discovery signal in a discovery frame 2 by using the frequency-time position (3, 2). Similarly, the user equipment a may continue to obtain frequency-time positions of the discovery signal in a discovery frame 4 and a discovery frame 5 by means of calculation according to the formula 1.5. Similarly, other user equipments in the first user equipment group may also determine a frequency-time position in the initial discovery frame by using a similar method, and perform frequency-time hopping. In addition, in the embodiment shown in FIG. 2, it can be apparently seen that for any user equipment shown in FIG. 2, frequency domain positions of a discovery signal of the user equipment in two adjacent discovery frames are different. If frequency-time positions used by any two user equipments in FIG. 2 in a current discovery frame are different, frequency-time positions used by the two user equipments in an adjacent discovery frame are also different. If time domain positions used by any two user equipments in FIG. 2 in the current discovery frame are the same, time domain positions used by the two user equipments in an adjacent discovery frame are different.

Apparently, it can be seen from FIG. 2 that a pattern of the discovery frame 5 is the same as a pattern of the discovery frame 1. That is, if the first user equipment group performs frequency-time hopping by using the formula 1.5 and sends the discovery signal, they can perform sending periodically according to patterns of the discovery frame 1 to the discovery frame 4. Therefore, the discovery frame 1 to the discovery frame 4 may be referred to as one pattern change period.

FIG. 3 is a schematic diagram of a pattern of a signal transmission method according to an embodiment of the present invention. FIG. 3 is a specific embodiment of FIG. 1. If a frequency-time hopping function is determined by using the formula 1.2, and m=n=3 and u=k=1 are set, four patterns that are of four consecutive discovery frames used by different user equipments in a second user equipment group to send a discovery signal and that are shown in FIG. 3 can be obtained, where there are nine user equipments in the second user equipment group, which are respectively indicated by using numbers 0 to 8. It should be noted that FIG. 3 is a specific embodiment that is provided merely to help a person skilled in the art to understand the embodiments of the present invention, instead of limiting the protection scope of the present invention.

FIG. 4 is a schematic diagram of a pattern of a signal transmission method according to an embodiment of the present invention. FIG. 4 is a specific embodiment of FIG. 1, where a frequency-time hopping function is determined by using the formula 1.1, and five patterns of five consecutive discovery frames used by different user equipments (respectively indicated by using $a_1$ to $t_1$) in a first user equipment group to send a discovery signal and five patterns of five consecutive discovery frames used by different user equipments (respectively indicated by using $a_2$ to $t_2$) in a second user equipment group to send a discovery signal are shown. Any user equipment in the first user equipment group may be considered as first user equipment in FIG. 1, and any user equipment in the second user equipment group may be considered as third user equipment in FIG. 1. It should be noted that FIG. 4 is a specific embodiment that is provided merely to help a person skilled in the art to understand the embodiments of the present invention, instead of limiting the protection scope of the present invention. In addition, "consecutive" in "the consecutive discovery frames" herein refers to continuity relative to discovery frames. Any two consecutive discovery frames may be separated by a time T that is used to transmit other information except a discovery signal, where T is a positive integer.

Both the first user equipment group and the second user equipment group in FIG. 4 determine the frequency-time hopping function by using the formula 1.1. Frequency-time hopping parameters used by each user equipment in the first user equipment group are m=5, n=5, $u_1$=3, and $v_1$=1, that is, m, n, $u_1$, and $v_1$ are substituted into the formula 1.1. Frequency-time hopping parameters used by each user equipment in the second user equipment group are m=5, n=5, $u_2$=2, and $v_2$=2, that is, m, n, $u_2$, and $v_2$ are substituted into the formula 1.1. It can be learned that the frequency-time hopping parameters used by the user equipment in the first user equipment group and the user equipment in the second user equipment group meet the following conditions: ($u_1$−$u_2$, m) and $v_1$*($u_1$−1)mod m≡$v_2$*($u_2$−1)mod m.

In other words, each user equipment in the first user equipment group uses the following formula as the frequency-time hopping function:

$$(i_{t+1}, j_{t+1}) = (3*i_t) \bmod 5, \{1*[(3*i_t) \bmod 5] + j_t - 1*i_t\} \bmod 5) \quad \text{Formula 1.7}$$

Each user equipment in the second user equipment group uses the following formula as the frequency-time hopping function:

$$(i_{t+1}, j_{t+1}) = (2*i_t) \bmod 5, \{2*[(2*i_t) \bmod 5] + j_t - 2*i_t\} \bmod 5) \quad \text{Formula 1.8}$$

Apparently, (3−2, 5)=1, and 1*(3−1)mod 5=2*(2−1)mod 5.

It is assumed that user equipment $f_1$ is randomly selected from the first user equipment group and is used as the first user equipment, a frequency-time position used by $f_1$ in a discovery frame 1 is (2, 0). In this case, user equipment $f_2$ that uses a frequency-time position the same as that used by the first user equipment $f_1$ is selected from the second user equipment group and is used as the third user equipment. In a discovery frame 2 to a discovery frame 4, frequency-time positions at which the first user equipment $f_1$ sends a discovery signal are respectively: (1, 4), (3, 1), and (4, 2); frequency-time positions at which the third user equipment $f_2$ sends a discovery signal are respectively: (4, 4), (3, 2), and (1, 3). It can be learned that the first user equipment $f_1$ and the third user equipment $f_2$ use a same time domain position only in the discovery frame 1 and the discovery frame 2. In this way, the first user equipment $f_1$ and the third user equipment $f_2$ can discover each other in the discovery frame 3 and the discovery frame 4. The first user equipment $f_1$ and the third user equipment $f_2$ do not use a same time domain position to send the discovery signal in three consecutive discovery frames. In other words, there is at least one discovery frame in the three consecutive discovery frames, where in the discovery frame, the first user equipment $f_1$ and the third user equipment $f_2$ use different time domain positions, and therefore can discover each other.

In this way, if user equipment in the first user equipment group and user equipment in the second user equipment group respectively use the formula 1.7 and the formula 1.8 as the frequency-time hopping function (that is, frequency-time hopping functions used by the first user equipment and the third user equipment are different), any two user equipments in the first user equipment group and the second user equipment group do not use a same time domain position to send a discovery signal in three consecutive discovery frames (that is, the first user equipment and the third user equipment do not use a same time domain position to send the discovery signal in three consecutive discovery frames).

Figure 5:
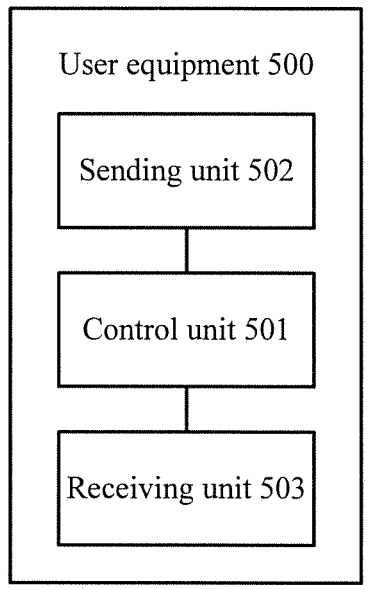
FIG. 5 is a structural block diagram of user equipment according to an embodiment of the present invention.

FIG. 5 is a structural block diagram of user equipment according to an embodiment of the present invention. The user equipment shown in FIG. 5 can perform all steps that are performed by first user equipment in FIG. 1. As shown in FIG. 5, the user equipment 500 includes: a control unit 501 and a sending unit 502.

The control unit 501 is configured to determine a frequency-time position with a frequency-time hopping invariant according to the frequency-time hopping invariant, where the frequency-time hopping invariant is used to indicate preset information.

The control unit 501 is further configured to determine an initial frequency-time position of a discovery signal in an initial discovery frame according to the frequency-time position with the frequency-time hopping invariant and an idle frequency-time position in the initial discovery frame.

The sending unit 502 is configured to send the discovery signal at the initial frequency-time position.

The control unit 501 is further configured to determine, according to a first frequency-time position of the discovery signal in a current discovery frame, a second frequency-time position of the discovery signal in a next discovery frame following the current discovery frame.

Specifically, the current discovery frame is the initial discovery frame or any discovery frame that is after the initial discovery frame and that is used to send the discovery signal, the first frequency-time position and the second frequency-time position are the frequency-time positions with the frequency-time hopping invariant, the first frequency-time position includes a first frequency domain position and a first time domain position, the second frequency-time position includes a second frequency domain position and a second time domain position, and the first frequency domain position is different from the second frequency domain position.

The sending unit 502 is further configured to send the discovery signal at the second frequency-time position.

The user equipment 500 shown in FIG. 5 can determine, according to a first frequency-time position of a discovery signal in a current discovery frame, a second frequency-time position of the discovery signal in a next discovery frame following the current discovery frame. In this case, the second frequency-time position of the discovery signal in the next discovery frame is related to the first frequency-time position of the discovery signal in the current discovery frame and is not related to an initial frequency-time position of the discovery signal or a frame number of a discovery frame. Further, there is a frequency-time hopping invariant, and the frequency-time hopping invariant can carry preset information. The user equipment 500 can determine, according to the frequency-time hopping invariant, the initial frequency-time position at which the discovery signal is sent. A frequency-time hopping invariant corresponding to the user equipment 500 does not vary with hopping of a frequency-time position of the discovery signal. Once knowing the frequency-time position of the discovery signal, a receive end of the discovery signal can determine preset information of the discovery signal corresponding to the frequency-time position. Therefore, a manner of using the frequency-time hopping invariant to carry the preset information is not limited by system bandwidth. In addition, it is not required to modulate the preset information into the discovery signal, and therefore system resources can be reduced.

Further, the preset information includes any one or more of the following: user equipment group information, information related to an identifier of the first user equipment, and a service type.

Further, the control unit 501 is specifically configured to determine the second frequency-time position by using a frequency-time hopping function, where inputs of the frequency-time hopping function are the first frequency domain position and the first time domain position, and outputs of the frequency-time hopping function are the second frequency domain position and the second time domain position.

Further, the sending unit 502 is specifically configured to: send the discovery signal by using the first frequency-time position different from a frequency-time position, in the current discovery frame, used by second user equipment to send a discovery signal, and send the discovery signal by using the second frequency-time position different from a frequency-time position, in the next discovery frame following the current discovery frame, used by the second user equipment to send the discovery signal, where the second user equipment and the user equipment use the same frequency-time hopping function.

Further, the sending unit 502 is specifically configured to: send the discovery signal by using the first frequency-time position that is the same as a time domain position, in the current discovery frame, used by the second user equipment to send the discovery signal and that is different from a frequency domain position, in the current discovery frame, used by the second user equipment to send the discovery signal, and send the discovery signal by using the second frequency-time position different from a time domain position, in the next discovery frame following the current discovery frame, used by the second user equipment to send the discovery signal.

Further, the control unit 501 is specifically configured to determine a frequency-time hopping function different from a frequency-time hopping function used by third user equipment.

Further, the sending unit 502 is specifically configured to send the discovery signal by using a discovery frame that does not overlap a time domain of discovery frame used by fourth user equipment to send the discovery signal.

Optionally, in an embodiment, the control unit 501 is specifically configured to determine the frequency-time hopping function by using the following formula:

$$(i_{t+1}, j_{t+1}) = (u^*i_t) \bmod m, \{v^*[(u^*i_t) \bmod m] + j_t - v^*i_t\} \bmod n)  \quad 1.9$$

where $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

In addition, the control unit 501 is specifically configured to determine the frequency-time position with the frequency-time hopping invariant by using the following formula:

$$C = (j - v^*i) \bmod n \quad 1.10$$

where C indicates the frequency-time hopping invariant, and i and j are respectively a frequency domain position with the frequency-time hopping invariant and a time domain position with the frequency-time hopping invariant.

Optionally, in another embodiment, the control unit 501 is specifically configured to determine the frequency-time hopping function by using the following formula:

$$(i_{t+1}, j_{t+1}) = ((i_t + u) \bmod m, (j_t + v^*i) \bmod n) \quad 1.11$$

where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

In addition, the control unit 501 is specifically configured to determine the frequency-time position with the frequency-time hopping invariant by using the following formula:

$$C = (i^2 - u^*i - 2v^{-1}*u^*j) \bmod m \quad 1.12$$

where C indicates the frequency-time hopping invariant, and i and j are respectively a frequency domain position with the frequency-time hopping invariant and a time domain position with the frequency-time hopping invariant.

Further, the user equipment 500 may further include a receiving unit 503, configured to receive any one or more of frequency-time hopping parameters sent by a base station, where the frequency-time hopping parameters include: m, n, u, and v.

Figure 6:
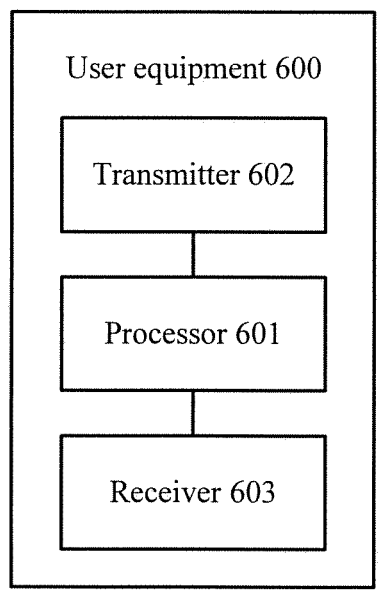
FIG. 6 is a structural block diagram of user equipment according to an embodiment of the present invention.

FIG. 6 is a structural block diagram of user equipment according to an embodiment of the present invention. The user equipment shown in FIG. 6 can perform all steps that are performed by first user equipment in FIG. 1. As shown in FIG. 6, the user equipment 600 includes: a processor 601 and a transmitter 602.

The processor 601 is configured to determine a frequency-time position with a frequency-time hopping invariant according to the frequency-time hopping invariant, where the frequency-time hopping invariant is used to indicate preset information.

The processor 601 is further configured to determine an initial frequency-time position of a discovery signal in an initial discovery frame according to the frequency-time position with the frequency-time hopping invariant and an idle frequency-time position in the initial discovery frame.

The transmitter 602 is configured to send the discovery signal at the initial frequency-time position.

The processor 601 is further configured to determine, according to a first frequency-time position of the discovery signal in a current discovery frame, a second frequency-time position of the discovery signal in a next discovery frame following the current discovery frame.

Specifically, the current discovery frame is the initial discovery frame or any discovery frame that is after the initial discovery frame and that is used to send the discovery signal, the first frequency-time position and the second frequency-time position are the frequency-time positions with the frequency-time hopping invariant, the first frequency-time position includes a first frequency domain position and a first time domain position, the second frequency-time position includes a second frequency domain position and a second time domain position, and the first frequency domain position is different from the second frequency domain position.

The transmitter 602 is further configured to send the discovery signal at the second frequency-time position.

The user equipment 600 shown in FIG. 6 can determine, according to a first frequency-time position of a discovery signal in a current discovery frame, a second frequency-time position of the discovery signal in a next discovery frame following the current discovery frame. In this case, the second frequency-time position of the discovery signal in the next discovery frame is related to the first frequency-time position of the discovery signal in the current discovery frame and is not related to an initial frequency-time position of the discovery signal or a frame number of a discovery frame. Further, there is a frequency-time hopping invariant, and the frequency-time hopping invariant can carry preset information. The user equipment 600 can determine, according to the frequency-time hopping invariant, the initial frequency-time position at which the discovery signal is sent. A frequency-time hopping invariant corresponding to the user equipment 600 does not vary with hopping of a frequency-time position of the discovery signal. Once knowing the frequency-time position of the discovery signal, a receive end of the discovery signal can determine preset information of the discovery signal corresponding to the frequency-time position. Therefore, a manner of using the frequency-time hopping invariant to carry the preset information is not limited by system bandwidth. In addition, it is not required to modulate the preset information into the discovery signal, and therefore system resources can be reduced.

Further, the preset information includes any one or more of the following: user equipment group information, information related to an identifier of the first user equipment, and a service type.

Further, the processor 601 is specifically configured to determine the second frequency-time position by using a frequency-time hopping function, where inputs of the frequency-time hopping function are the first frequency domain position and the first time domain position, and outputs of the frequency-time hopping function are the second frequency domain position and the second time domain position.

Further, the transmitter 602 is specifically configured to: send the discovery signal by using the first frequency-time position different from a frequency-time position, in the current discovery frame, used by second user equipment to send a discovery signal, and send the discovery signal by using the second frequency-time position different from a frequency-time position, in the next discovery frame following the current discovery frame, used by the second user equipment to send the discovery signal, where the second user equipment and the user equipment use the same frequency-time hopping function.

Further, the transmitter 602 is specifically configured to: send the discovery signal by using the first frequency-time position that is the same as a time domain position, in the current discovery frame, used by the second user equipment to send the discovery signal and that is different from a frequency domain position, in the current discovery frame, used by the second user equipment to send the discovery signal, and send the discovery signal by using the second frequency-time position different from a time domain position, in the next discovery frame following the current discovery frame, used by the second user equipment to send the discovery signal.

Further, the processor 601 is specifically configured to determine a frequency-time hopping function different from a frequency-time hopping function used by third user equipment.

Further, the transmitter 602 is specifically configured to send the discovery signal by using a discovery frame that does not overlap a time domain of discovery frame used by fourth user equipment to send the discovery signal.

Optionally, in an embodiment, the processor 601 is specifically configured to determine the frequency-time hopping function by using the following formula:

$$(i_{t+1}, j_{t+1}) = (u^*i_t) \bmod m, \{v^*[(u^*i_t) \bmod m] + j_t - v^*i_t\} \bmod n)$$  1.12 where $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

In addition, the processor 601 is specifically configured to determine the frequency-time position with the frequency-time hopping invariant by using the following formula:

$$C = (j - v^*i) \bmod n$$  1.13 where C indicates the frequency-time hopping invariant, and i and j are respectively a frequency domain position with the frequency-time hopping invariant and a time domain position with the frequency-time hopping invariant.

Optionally, in another embodiment, the processor 601 is specifically configured to determine the frequency-time hopping function by using the following formula:

$$(i_{t+1}, j_{t+1}) = ((i_t + u) \bmod m, (j_t + v^*i) \bmod n)$$  1.14 where $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

In addition, the processor 601 is specifically configured to determine the frequency-time position with the frequency-time hopping invariant by using the following formula:

$$C = (i^2 - u^*i - 2v^{-1}*u^*j) \bmod m$$  1.15 where C indicates the frequency-time hopping invariant, and i and j are respectively a frequency domain position with the frequency-time hopping invariant and a time domain position with the frequency-time hopping invariant.

Further, the user equipment 600 may further include a receiver 603, configured to receive any one or more of frequency-time hopping parameters sent by a base station, where the frequency-time hopping parameters include: m, n, u, and v.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending a discovery signal, wherein the method is performed by a first user equipment, the method comprising:
   determining a frequency-time position with a frequency-time hopping invariant according to the frequency-time hopping invariant, wherein the frequency-time hopping invariant is used to indicate preset information;
   determining an initial frequency-time position of a discovery signal in an initial discovery frame according to the frequency-time position with the frequency-time hopping invariant and an idle frequency-time position in the initial discovery frame;
   sending the discovery signal at the initial frequency-time position;
   determining, according to a first frequency-time position of the discovery signal in a current discovery frame, a second frequency-time position of the discovery signal in a next discovery frame following the current discovery frame, wherein the current discovery frame is the initial discovery frame or any discovery frame that is after the initial discovery frame and that is used to send the discovery signal, the first frequency-time position and the second frequency-time position are the frequency-time positions with the frequency-time hopping invariant, the first frequency-time position comprises a first frequency domain position and a first time domain position, the second frequency-time position comprises a second frequency domain position and a second time domain position, and the first frequency domain position is different from the second frequency domain position; and
   sending the discovery signal at the second frequency-time position.

2. The method according to claim 1, wherein the preset information comprises any one or more of the following: user equipment group information, information related to an identifier of the first user equipment, and a service type.

3. The method according to claim 2, wherein determining, according to the first frequency-time position of the discovery signal in the current discovery frame, the second frequency-time position of the discovery signal in the next discovery frame following the current discovery frame comprises:
   determining the second frequency-time position by using a frequency-time hopping function, wherein inputs of the frequency-time hopping function are the first frequency domain position and the first time domain position, and outputs of the frequency-time hopping function are the second frequency domain position and the second time domain position.

4. The method according to claim 3, wherein:
   if the first frequency-time position is different from a frequency-time position of a discovery signal of second user equipment in the current discovery frame, the second frequency-time position is different from a frequency-time position of the discovery signal of the second user equipment in the next discovery frame following the current discovery frame, wherein the second user equipment and the first user equipment use the same frequency-time hopping function; or
   if the first time domain position is the same as a time domain position of a discovery signal of second user equipment in the current discovery frame and the first frequency domain position is different from a frequency domain position of the discovery signal of the second user equipment in the current discovery frame, the second time domain position is different from a time domain position of the discovery signal of the second user equipment in the next discovery frame following the current discovery frame.

5. The method according to claim 3, wherein:
   the frequency-time hopping function is different from a frequency-time hopping function used by a third user equipment.

6. The method according to claim 3, wherein:
   a time domain of a discovery frame used by the first user equipment to send the discovery signal does not overlap a time domain of a discovery frame used by a fourth user equipment to send the discovery signal.

7. The method according to claim 3, wherein the frequency-time hopping function is determined by using the following formula:

$$(i_{t+1}, j_{t+1}) = (u*i_t) \bmod m, \{v*[(u*i_t) \bmod m] + j_t - v*i_t\} \bmod n),$$

wherein $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

8. The method according to claim 7, wherein the frequency-time position with the frequency-time hopping invariant is determined by using the following formula:

$$C=(j-v*i) \bmod n,$$

wherein C indicates the frequency-time hopping invariant, and i and j are respectively a frequency domain position with the frequency-time hopping invariant and a time domain position with the frequency-time hopping invariant.

9. The method according to claim 3, wherein the frequency-time hopping function is determined by using the following formula:

$$(i_{t+1}, j_{t+1})=((i_t+u) \bmod m, (j_t+v*i) \bmod n),$$

wherein $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

10. The method according to claim 9, wherein the frequency-time position with the frequency-time hopping invariant is determined by using the following formula:

$$C=(i^2-u*i-2v^{-1}*u*j) \bmod m,$$

wherein C indicates the frequency-time hopping invariant, and i and j are respectively a frequency domain position with the frequency-time hopping invariant and a time domain position with the frequency-time hopping invariant.

11. The method according to claim 7, wherein before determining the frequency-time position with the frequency-time hopping invariant, the method further comprises:
  receiving any one or more of frequency-time hopping parameters sent by a base station, wherein the frequency-time hopping parameters comprise: m, n, u, and v.

12. A user equipment, wherein the user equipment comprises:
  a processor, configured to:
    determine a frequency-time position with a frequency-time hopping invariant according to the frequency-time hopping invariant, wherein the frequency-time hopping invariant is used to indicate preset information; and
    determine an initial frequency-time position of a discovery signal in an initial discovery frame according to the frequency-time position with the frequency-time hopping invariant and an idle frequency-time position in the initial discovery frame; and
  a transmitter, configured to send the discovery signal at the initial frequency-time position; wherein
  the processor is further configured to determine, according to a first frequency-time position of the discovery signal in a current discovery frame, a second frequency-time position of the discovery signal in a next discovery frame following the current discovery frame, wherein the first frequency-time position comprises a first frequency domain position and a first time domain position, and the second frequency-time position comprises a second frequency domain position and a second time domain position; and
  the transmitter is further configured to send the discovery signal at the second frequency-time position.

13. The user equipment according to claim 12, wherein the processor is configured to determine the second frequency-time position by using a frequency-time hopping function, wherein inputs of the frequency-time hopping function are the first frequency domain position and the first time domain position, and outputs of the frequency-time hopping function are the second frequency domain position and the second time domain position.

14. The user equipment according to claim 13, wherein:
  the transmitter is configured to:
    send the discovery signal by using the first frequency-time position different from a frequency-time position, in the current discovery frame, used by second user equipment to send a discovery signal, and send the discovery signal by using the second frequency-time position different from a frequency-time position, in the next discovery frame following the current discovery frame, used by the second user equipment to send the discovery signal, wherein the second user equipment and the user equipment use the same frequency-time hopping function; or
    send the discovery signal by using the first frequency-time position that is the same as a time domain position, in the current discovery frame, used by the second user equipment to send the discovery signal and that is different from a frequency domain position, in the current discovery frame, used by the second user equipment to send the discovery signal, and send the discovery signal by using the second frequency-time position different from a time domain position, in the next discovery frame following the current discovery frame, used by the second user equipment to send the discovery signal.

15. The user equipment according to claim 13, wherein:
  the processor is configured to determine a frequency-time hopping function different from a frequency-time hopping function used by third user equipment.

16. The user equipment according to claim 13, wherein:
  the transmitter is configured to send the discovery signal by using a discovery frame that does not overlap a time domain of discovery frame used by another user equipment to send the discovery signal.

17. The user equipment according to claim 13, wherein the processor is configured to determine the frequency-time hopping function by using the following formula:

$$(i_{t+1}, j_{t+1})=(u*i_t) \bmod m, \{v*[(u*i_t) \bmod m]+j_t-v*i_t\} \bmod n),$$

wherein $i_t$ is the first frequency domain position, $i_{t+1}$ is the second frequency domain position, $j_t$ is the first time domain position, and $j_{t+1}$ is the second time domain position; m, n, u, and v are all positive integers, m exactly divides n, u is relatively prime to m, (u−1) is relatively prime to m, and v is relatively prime to m.

18. The user equipment according to claim 17, wherein the processor is configured to determine the frequency-time position with the frequency-time hopping invariant by using the following formula:

$$C=(j-v*i) \bmod n,$$

wherein C indicates the frequency-time hopping invariant, and i and j are respectively a frequency domain position with the frequency-time hopping invariant and a time domain position with the frequency-time hopping invariant.

19. The user equipment according to claim 18, wherein the processor is configured to determine the frequency-time hopping function by using the following formula:

$$(i_{t+1}, j_{t+1})=((i_t+u) \bmod m, (j_t+v*i) \bmod n),$$

wherein $i_t$ is the first frequency domain position, $i_{t+1}$ is the second frequency domain position, $j_t$ is the first time domain position, and $j_{t+1}$ is the second time domain position; m, n, u, and v are all positive integers, u is relatively prime to m, v is relatively prime to n, and m exactly divides n.

20. The user equipment according to claim 19, wherein the processor is configured to determine the frequency-time position with the frequency-time hopping invariant by using the following formula:

$$C = (i^2 - u*i - 2v^{-1}*u*j) \bmod m,$$

wherein C indicates the frequency-time hopping invariant, and i and j are respectively a frequency domain position with the frequency-time hopping invariant and a time domain position with the frequency-time hopping invariant.

21. The user equipment according to claim 17, wherein the user equipment further comprises:
a receiver, configured to receive any one or more of frequency-time hopping parameters sent by a base station, wherein the frequency-time hopping parameters comprise: m, n, u, and v.

* * * * *